(12) United States Patent
Charrier et al.

(10) Patent No.: US 11,808,784 B2
(45) Date of Patent: Nov. 7, 2023

(54) PORTABLE ELECTROCHEMICAL MICROSCOPY DEVICE, KITS COMPRISING SAME AND USES THEREOF

(71) Applicants: COMMISSARIAT A L'ENERGIE ATOMIQUE ET AUX ENERGIES ALTERNATIVES, Paris (FR); CENTRE NATIONAL DE LA RECHERCHE SCIENTIFIQUE, Paris (FR)

(72) Inventors: Gaëlle Charrier, Versailles (FR); Aurélien Doublet, Paris (FR); Guy Deniau, Les Essarts-le-Roi (FR); Renaud Cornut, Chatillon (FR)

(73) Assignees: COMMISSARIAT A L'ENERGIE ATOMIQUE ET AUX ENERGIES ALTERNATIVES, Paris (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 0 days.

(21) Appl. No.: 17/258,587

(22) PCT Filed: Jul. 5, 2019

(86) PCT No.: PCT/FR2019/051681
§ 371 (c)(1),
(2) Date: Jan. 7, 2021

(87) PCT Pub. No.: WO2020/012097
PCT Pub. Date: Jan. 16, 2020

(65) Prior Publication Data
US 2021/0156884 A1 May 27, 2021

(30) Foreign Application Priority Data
Jul. 9, 2018 (FR) ...................................... 1856295

(51) Int. Cl.
*G01Q 60/60* (2010.01)
*G01N 27/416* (2006.01)

(52) U.S. Cl.
CPC .......... *G01Q 60/60* (2013.01); *G01N 27/416* (2013.01)

(58) Field of Classification Search
CPC ............................ G01Q 60/60; G01N 27/416
See application file for complete search history.

(56) References Cited

U.S. PATENT DOCUMENTS 7,119,030 B2  10/2006  Bureau et al.
9,381,541 B2   7/2016  Deniau et al.
(Continued)

FOREIGN PATENT DOCUMENTS

WO   WO 2010/055306 A1   5/2010
WO   WO 2014/024187 A1   2/2014
WO   WO 2015/121462 A1   8/2015

OTHER PUBLICATIONS

U.S. Appl. No. 13/807,180, filed Jan. 3, 2013, US 2013/0108865 A1, Pascal Boulanger, et al.
(Continued)

*Primary Examiner* — David A Vanore
(74) *Attorney, Agent, or Firm* — Oblon, McClelland, Maier & Neustadt, L.L.P.

(57) ABSTRACT

The invention relates to the field of localized surface analysis, characterization and modification by electrochemistry. It particularly relates to a portable electrochemical microscopy device, to kits comprising such a portable device, and to uses of the portable device and kits. According to the invention, the portable device comprises: a body having a gripping surface for a user and a bearing surface that can be applied to a surface of a substrate to be analyzed; an electrolytic chamber formed in the body and arranged so as to receive an electrolyte, the electrolytic chamber comprising an opening (Continued)

leading to the bearing surface; and a working probe having a distal end arranged in the electrolytic chamber.

17 Claims, 9 Drawing Sheets

(56) References Cited

U.S. PATENT DOCUMENTS

| | | | |
|---|---|---|---|
| 9,790,370 B2 | 10/2017 | Mevellec et al. | |
| 10,497,932 B2 | 12/2019 | Charrier et al. | |
| 10,712,284 B2 | 7/2020 | Doizi et al. | |
| 2010/0037360 A1* | 2/2010 | Jo | G01Q 70/02 |
| | | | 850/53 |
| 2011/0213229 A1 | 9/2011 | Benoit | |
| 2013/0140191 A1* | 6/2013 | Unwin | G01N 27/416 |
| | | | 205/790.5 |
| 2013/0314093 A1* | 11/2013 | Cheng | G01N 17/02 |
| | | | 324/425 |
| 2015/0150493 A1* | 6/2015 | Shacham-Diamand | |
| | | | G01N 27/327 |
| | | | 205/792 |
| 2016/0245773 A1* | 8/2016 | Eldershaw | G01N 27/416 |
| 2017/0173577 A1 | 6/2017 | Ausserre et al. | |
| 2018/0052187 A1* | 2/2018 | Unwin | G01Q 60/60 |

OTHER PUBLICATIONS

International Search Report dated Oct. 7, 2019 in PCT/FR2019/051681 filed on Jul. 5, 2019, 2 pages.

French Preliminary Search Report dated Apr. 25, 2019 in French Application 1856295 filed on Jul. 9, 2018 (with English translation of Categories of Cited Documents), 2 pages.

* cited by examiner

PORTABLE ELECTROCHEMICAL MICROSCOPY DEVICE, KITS COMPRISING SAME AND USES THEREOF

TECHNICAL FIELD

The invention relates to the field of the analysis, characterization and localized modification of surfaces by electrochemistry.

More specifically, the invention relates to a portable (or handheld) electrochemical microscopy device which, while offering the same performances as "Scanning Electro-Chemical Microscopy" (SECM) apparatuses of the prior art, makes it possible to avoid the constraints imposed by these apparatuses and, in particular, by the limited dimensions of the electrochemical cell thereof and by the size of the electrical and/or mechanical elements provided in these apparatuses to carry out and control scanning.

The invention also relates to kits comprising such a portable device as well the uses of this device and these kits.

The invention is applicable in all the fields of use of SECM. However, it has a very specific interest when it is sought to use this technique to study and/or locally modify the surface of parts of large sizes or of complex shapes, for example:

- to detect manufacturing defects, such as a heterogeneity of the coating (insulator, semiconductor or conductor) included in these parts;
- to detect a localized porosity of the surface of parts or of the coating included therein;
- to detect a localized corrosion of parts which are protected from corrosion either naturally, by forming a thin passivating oxide layer as in the case of titanium or steel parts, or by a corrosion-proof coating capable of deteriorating; or
- to microstructure the surface of parts, for example with localized depositions of a metal or a polymer, or by localized etching of this surface.

PRIOR ART

SECM is a local probe microscopy technique which offers the possibility of examining, imaging but also of locally modifying the surface of a sample by electrochemistry by means of a probe which is a miniaturized electrode, referred to as ultramicroelectrode (or UME), and which scans this surface.

This technique, which was invented in the late 1980s by Professor Allen J. Bard and his team, represents a major advance in electrochemistry, enabled thanks to, on one hand, electrode miniaturization and, on the other, the possibility of measuring very weak currents.

It has been the focus of very particular attention on the part of the scientific community as it is considered as an extremely effective tool and offers an array of applications in fields as varied as biology for characterizing living cells, molecular electrochemistry for determining complex reaction mechanisms or the study of rapid kinetics, in materials science for the development of new catalysts, or indeed to study material degradation or corrosion.

Currently, SECM is used with apparatuses of which a typical example is illustrated schematically in FIG. 1. As this figure shows, this apparatus, referenced 1, comprises:

- an electrochemical cell 10 which is envisaged to be filled with an electrolytic solution 15 optionally comprising a salt (mineral or organic) enabling a good conductivity and/or an electroactive (electrooxidizing or electroreducing) species or redox mediator, and wherein are immersed, under operating conditions, the sample 11 to be analyzed, the UME 12, a counter-electrode 13 and optionally a reference electrode 14;
- a potentiostat if a potential is intended to be applied solely to the UME 12 under operating conditions or, as shown in FIG. 1, a bipotentiostat 16 if a potential is intended to be applied both to the sample 11 and to the UME 12 under operating conditions;
- a positioning system for positioning the UME 12 relative to the sample 11 to be analyzed and controlling this positioning; and
- a computer system 17 for acquisition and processing of the data, i.e., currents measured with the UME 12 while it scans the surface of the sample 11, which will particularly be dependent on the distance separating the UME 12 from the surface of the sample 11 and the characteristics of this surface.

For the relative positioning of the UME 12 and of the sample 11 to be analyzed, two types of system exist, namely:

- a system, which is that illustrated in FIG. 1, wherein the electrochemical cell 10 rests on a movable plate 18 capable of moving in the directions x and y, and the UME 12 is set in motion in the direction z, i.e., in a perpendicular direction to the surface of the sample 11, by means of a motorized arm 19; and
- a system wherein the electrochemical cell 10 is fixed, and the UME 12 is set in motion in the three directions x, y and z, also by means of motorized arms.

SECM apparatuses therefore have two constraints: the first is linked with the fact that they are only suitable for working on samples wherein the dimensions are imposed by the dimensions of the electrochemical cell, which makes the use of SECM impossible for studying the surface of parts of large sizes or complex shapes except to destroy these parts to remove samples therefrom or work on control samples, supposed to be representative of these parts which are not the parts themselves; the second is linked with the size of the system for positioning the UME relative to the sample and controlling this positioning.

This explains why SECM currently remains a technique of academic or industrial research body laboratories.

The Inventors therefore set themselves the aim of providing an electrochemical microscopy device which, while offering the same application possibilities and providing the same electrochemical information as the SECM apparatuses of the prior art, makes it possible to avoid the constraints imposed by these apparatuses.

In particular, they set themselves the aim of providing an electrochemical microscopy device which is portable and makes it possible to study or modify the surface of parts on the location of the manufacture thereof or of the use thereof. A further aim of the invention is that of providing a portable electrochemical microscopy device wherein the design, production and maintenance costs are compatible with industrial-scale use.

DESCRIPTION OF THE INVENTION

These different aims are achieved by the invention which is based on the adaptation of an electrochemical cell in the form of a stylus, the electrolyte being applied locally on a surface of the substrate to be analyzed by contacting one end of the stylus with the surface to be analyzed. Thus, it is no longer necessary to immerse the whole substrate in an electrolytic solution; the electrolyte used as a medium between the working probe and the surface of the substrate to be analyzed is supplied locally at the level of this surface. The device thus formed still makes it possible to analyze a plurality of points on the surface of the substrate by moving the device over each of these points.

More specifically, the invention firstly relates to a portable electrochemical microscopy device, which comprises:
- a body having a gripping surface for a user and a bearing surface capable of bearing on a surface of a substrate to be analyzed,
- an electrolytic chamber formed in the body, arranged to receive an electrolyte, the electrolytic chamber including an opening leading to the bearing surface, and
- a working probe having a distal end disposed in the electrolytic chamber.

The gripping surface provided on the body is preferably arranged to enable handling by a user. It is presented for example in the form of a cylindrical surface with a circular cross-section. The diameter can be between 0.5 cm (centimeter) and 10 cm, such that the device can be held in one hand, for example in the manner of a stylus. The gripping surface can also be presented in the form of a surface, cylindrical or non-cylindrical, with a polygonal cross-section, for example square or hexagonal. It can furthermore be profiled to form a handle.

The bearing surface provided on the body is preferably arranged to able to conform to the surface of the substrate to be analyzed. The bearing surface can be curved or planar. It can be inscribed in a surface area between 0.2 $cm^2$ (centimeters squared) and 100 $cm^2$.

The electrolytic chamber is preferably arranged to be able to contain an electrolyte for the duration of a measurement or a sequence of measurements. Thus, it advantageously has walls impermeable to the electrolyte. The volume of the electrolytic chamber is for example between 0.04 $cm^3$ (cubic centimeters) and 400 $cm^3$. Advantageously, it is between 0.5 $cm^3$ and 2 $cm^3$.

As a general rule, the portable device is preferably arranged such that, during use, the bearing surface being in contact with the substrate, the electrolyte is contained in the volume delimited, on one hand, by the electrolytic chamber and, on the other, by the substrate, and is both in contact with the substrate and with the distal end of the working probe.

The working probe typically consists of an electrode including a glass capillary and a conducting wire sealed in the capillary. The conducting wire is for example made of gold, platinum, or carbon fiber. The working probe can have a cylindrical shape. Preferably, the working probe is arranged such that the longitudinal axis thereof is perpendicular to a plane passing through the bearing surface of the body. For a curved bearing surface, a plane passing through this surface is defined as being a plane passing through at least one point of the bearing surface. The diameter of the working probe can be between 10 μm (micrometers) and 100 μm. Preferably, it is between 20 μm and 50 μm. Generally, the diameter of the probe is determined according to the measurement resolution sought. Moreover, the working probe is advantageously arranged such that the distal end thereof is located at a predetermined distance from a plane passing through the bearing surface of the body. The predetermined distance is for example between 0 μm and 200 μm, between 5 μm and 200 μm or between 5 μm and 150 μm.

According to a first alternative embodiment, the working probe is attached to the body, such that the distal end thereof is fixed with respect to a plane passing through the bearing surface. The distance separating the distal end of the working probe of the substrate is then constant.

According to a second alternative embodiment, the portable device further comprises a positioning device arranged to enable a movement of the working probe relative to the bearing surface. Advantageously, the positioning device is arranged to enable a movement along a translation axis perpendicular to a plane passing through the bearing surface. The positioning device then makes it possible to place the working probe at a desired distance from the substrate. The distance between the working probe and the substrate corresponds substantially to the distance between the working probe and the plane passing through the bearing surface of the body.

The positioning device can particularly include a movable member and a drive mechanism. The movable member is arranged to bear the working probe and to be capable of being moved relative to the body. It can particularly be arranged to be capable of being moved in translation with respect to the body along an axis of translation. The drive mechanism is arranged to move the movable member with respect to the body.

According to a specific embodiment, the body of the portable device includes a guide housing, the guide housing and the movable member being arranged so that the movable member is guided in translation with respect to the body. The guide housing and the movable member have for example complementary cylindrical shapes.

The drive mechanism can particularly include an electromechanical actuator such as a piezoelectric motor or a step motor. Such actuators induce movements of relatively small amplitude and enable a positioning of the working probe with a resolution of the order of a few μm.

The drive mechanism can also include a manual actuator. In particular, it can include a micrometric screw. A micrometric screw has a reference surface and a movable surface and is arranged to enable a modification of a distance separating the reference surface from the mobile surface. The reference surface is arranged to be rigidly connected to the body and the movable surface is arranged to be rigidly connected to the movable member.

In a specific embodiment, the movable member includes a housing for receiving the working probe and an attachment member. The receiving housing is arranged to receive a proximal end of the working probe and the attachment member is arranged to attach the working probe to the movable member. In particular, the movable member can be arranged to attach the working probe at the level of the proximal end thereof. In a first embodiment example, the receiving housing includes a revolving cylindrical orifice of greater diameter than the diameter of the working probe and the attachment member includes a screw arranged to be able to press the working probe against a surface of the cylindrical orifice. In a second embodiment example, adapted to a working probe wherein the proximal end has a protuberance, the receiving housing includes a first revolving cylindrical orifice and a second revolving cylindrical orifice. The two orifices are concentric. The first orifice opens, on one hand, into the electrolytic chamber and, on the other, into the second orifice. The first orifice has a diameter greater than a working probe body and less than a diameter of the protuberance. The second orifice is opening and has a diameter greater than the diameter of the protuberance. It thus forms a recess intended to receive the protuberance. The attachment member can then consist of a plug of elastomeric material wherein the dimensions are arranged to be able to plug the second orifice and prevent the removal of the working probe.

The positioning device can further include a temporary coupling mechanism for reversibly coupling the movable member with the drive mechanism. In a first embodiment example, the temporary coupling mechanism includes a permanent magnet, the permanent magnet being rigidly connected to the movable member or the drive mechanism and arranged so as to be able to be coupled with a metallic element rigidly connected to the mechanism or the movable member. The coupling mechanism can include several permanent magnets. In a second embodiment example, the temporary coupling mechanism includes a set of male-female parts capable of being coupled by elastic deformation, one of the parts being rigidly connected to the movable member and the other part being rigidly connected to the drive mechanism.

According to a specific embodiment, the portable device further includes at least one additional working probe, each additional working probe having a distal end disposed in the electrolytic chamber. The portable device can particularly include two, three or four additional working probes, or three, four or five working probes. The working probes can be of the same type as the working probe described above. They can in particular be identical with one another. The probes can be arranged such that the distal ends thereof are all located at the same distance with respect to a plane passing through the bearing surface. They then make it possible to multiply the measurement points without moving the portable device. The probes can be arranged so as to be aligned along an axis, so as to form a circle or a star. In an alternative embodiment, at least two working probes can be arranged such that the distal ends thereof are located at separate distances with respect to the plane passing through the bearing surface. When the portable device includes a movable member capable of being moved by a drive mechanism, the additional working probes are advantageously mounted on the movable member, such that all the working probes follow the same movement.

According to a further specific embodiment, compatible with the preceding one, the portable device further includes a so-called standardization probe. This probe, which is of the same type as the working probe(s), is arranged such that the distal end thereof is located at an infinite distance from the plane passing through the bearing surface. The distance is for example considered infinite when it is greater than or equal to 7 times the height of the conducting wire sealed in the capillary. The standardization probe makes it possible to determine an infinite current, i.e., a current passing through a working probe when it is located at an infinite distance from the substrate. The standardization probe can be fixed with respect to the body of the portable device.

The portable device can further include a counter-electrode and optionally a reference electrode. These electrodes are arranged such that the distal ends thereof are disposed in the electrolytic chamber. According to a first alternative embodiment, the counter-electrode and, where applicable, the reference electrode are fixed with respect to the body, such that the distal end thereof is fixed with respect to a plane passing through the bearing surface of the body. According to a second alternative embodiment, the counter-electrode and, where applicable, the reference electrode move with the working probe(s) relative to the bearing surface. These electrodes are for example mounted on the movable member of the positioning device.

In a first embodiment, an outer surface of the body of the portable device forms a revolving cylinder. The gripping surface is then formed by the whole outer surface of the body, the body being presented in the form of a stylus.

In a second embodiment, the body includes a cylindrical section and a tapered section. The cylindrical section has an outer surface forming a revolving cylinder and the tapered section has an outer surface forming a frustum flaring between a first base, rigidly connected to the cylindrical section, and a second base forming the bearing surface. The first base preferably has a diameter equal to the diameter of the cylindrical section. In this embodiment, the gripping surface can be formed by the outer surface of the cylindrical section and/or the outer surface of the tapered section. This embodiment has the advantage of being able to have a relatively large bearing surface for better stability of the device, while retaining a gripping surface wherein the dimensions are adapted to handling by a user.

According to a specific embodiment, the body includes an electrolyte injection orifice extending between an outer surface of the body and the electrolytic chamber. This electrolyte injection orifice makes it possible to supply the electrolyte needed for the measurement while the portable device is in the operational position, the bearing surface being in contact with the substrate. The body can include a check valve disposed in the electrolyte injection orifice or a plug capable of plugging this orifice.

Moreover, the body can include a wire passage opening arranged to be able to pass one or more connection wires between the working probe and the outside of the body. In particular, when the body of the portable device includes a guide housing enabling the guidance in translation of a movable member, the wire passage opening can be arranged between an outer surface of the body and the guide housing.

The invention also relates to kits comprising a portable device as described above.

In a first embodiment, the kit comprises the device filled with an electrolyte and instructions for use.

In a further embodiment, the kit comprises the device, a container, for example of the hermetically sealed bottle type, containing an electrolyte and operating instructions.

According to the invention, the electrolyte can be presented in a liquid form or in the form of a gel.

When it is presented in a liquid form, then it advantageously consists either of an aqueous or organic solution comprising at least one compound capable of ionizing in solution, for example a mineral or organic salt, and optionally at least one redox mediator, or an ionic liquid optionally comprising at least one redox mediator.

When it is presented in the form of a gel, then it advantageously consists of a gel obtained by adding a gelling agent such as gelatin, pectin, agar-agar, alginate, gum arabic, xanthan gum, carrageenan or the like, to an aqueous or organic solution as defined above or to an ionic liquid as defined above.

The salt can particularly be a metallic salt and, in particular, an alkaline metal such as sodium chloride or potassium chloride.

As regards the redox mediator, it can be selected from all the electroactive species the use of which has been proposed in SECM according to the purpose for which the device is intended. Thus, it can both be of inorganic nature such as ruthenium hexaamine $[Ru(NH_3)_6]^{3+/2+}$ or ferri/ferrocyanide $[Fe(CN)_6]^{3-/4-}$, of organometallic nature such as ferrocene $[FcCp_2]^{+/0}$ and decamethylferrocene $Me_{10}[FcCp_2]^{+/0}$ and of organic nature such as dopamine or 1,2-naphthoquinone.

The invention further relates to the use of a device such as a kit as defined above for analyzing, characterizing and/or locally modifying a surface.

Further advantages and features of the invention will emerge on reading the following supplementary description, which refers to the figures appended, and which relates to embodiment examples of the device according to the invention as well as to experimental tests validating this portable device.

It is obvious that these examples are given merely by way of illustrations of the subject matter of the invention and in no way represent a limitation of this subject matter.

DETAILED DESCRIPTION OF SPECIFIC EMBODIMENTS

Hereinabove and hereinafter, the term "insulating" means "electrical insulator" whereas the term "conductive" means "electrical conductor".

I—Device According to the Invention

Figure 1:
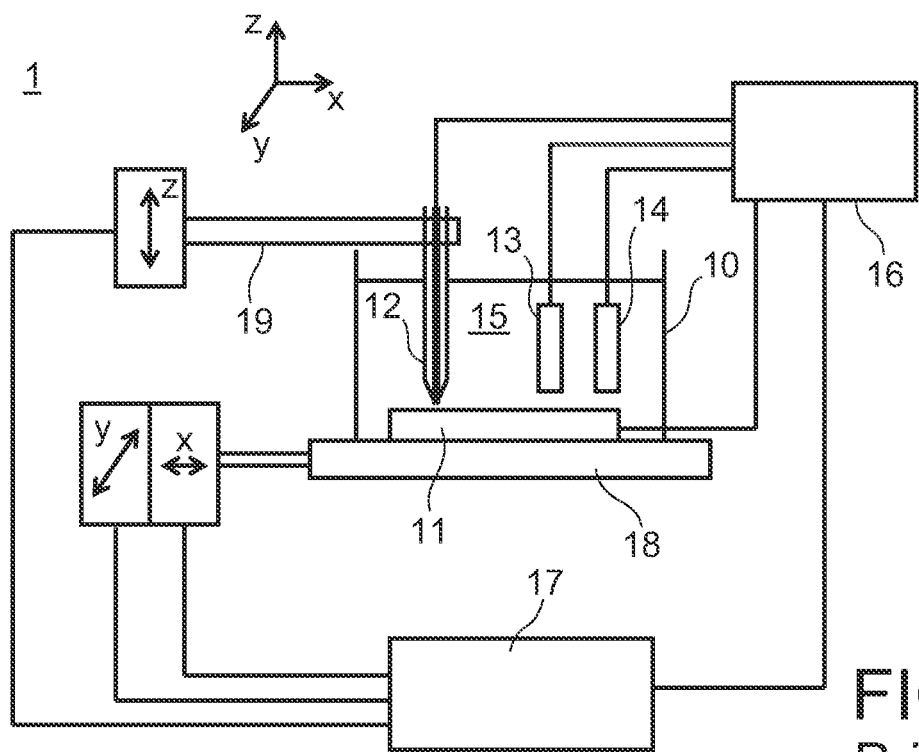
FIG. 1, commented on above, schematically illustrates a typical example of an SECM apparatus according to the prior art.
Figure 2:
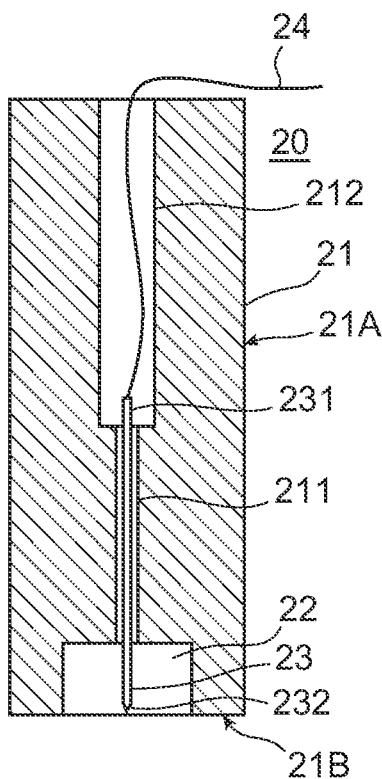
FIG. 2 represents, in a longitudinal sectional view, a first embodiment example of a portable electrochemical microscopy device according to the invention.

FIG. 2 represents, in a longitudinal sectional view, a first embodiment example of a portable electrochemical microscopy device according to the invention. The portable device 20 includes a body 21, an electrolytic chamber 22 formed in the body 21 and a working probe 23. The body 21 has an outer surface forming a revolving cylinder. This outer surface forms a gripping surface 21A for a user. The outer diameter of the body 21 can be between 0.5 cm and 10 cm. It is for example equal to 2 cm. The length of the body 21 can be between 3 cm and 20 cm. It is for example equal to 6 cm. The electrolytic chamber 22 is formed in the body 21 and opens onto the surface of one of the longitudinal ends of the body 21, referred to as the lower end. The remaining surface of this end forms a bearing surface 21B for the portable device 20. The electrolytic chamber 22 forms for example a revolving cylinder wherein the longitudinal axis is merged with the longitudinal axis of the body 21. The bearing surface 21B is then annular. The electrolytic chamber 22 has for example a diameter equal to 1 cm and a height equal to 0.5 cm. The body 21 further includes a housing for receiving the working probe 211 and a wire passage opening 212. The receiving housing 211 opens, on one hand, into the electrolytic chamber 22 and, on the other, into the wire passage opening 212. It is provided to receive the working probe 23. The dimensions of the receiving housing 211 are adapted to those of the working probe 23. They enable for example a clearance fit. The wire passage opening 212 is formed in the body 21 so as to open onto the surface of the upper end of the body 21, i.e., the longitudinal end opposite the end whereon the electrolytic chamber 22 is formed. The wire passage opening 212 is arranged to allow the passage of a connection wire 24 from the proximal end 231 of the working probe to the exterior of the body 21. The working probe 23 is arranged such that the distal end 232 thereof is disposed in the electrolytic chamber 22. It is furthermore arranged such that the distal end 232 thereof is located at a predetermined distance from a plane passing through the bearing surface 21B. This distance, referred to as the working distance, is for example between 0 µm and 200 µm. The working probe 23 typically has a revolving cylinder shape. The distal end 232 thereof can be planar or form a tip. The working probe 23 is fixed with respect to the body 21. The attachment is for example provided by bonding. The probe 23 consists for example of an electrode including a glass capillary and a conducting wire inserted in the capillary. This type of electrode is commonly referred to as an "ultramicroelectrode" or "UME".

The portable device 20 is suitable for use as follows. An electrolyte is disposed in the electrolytic chamber 22. The electrolyte can be presented in a liquid form or in the form of a gel. The gel form has the advantage of being held more easily in the electrolytic chamber 22. The body 21 is then handled by a user via the gripping surface 21A thereof and manipulated such that the bearing surface 21B thereof bears on a surface of a substrate to be analyzed. The electrolyte present in the electrolytic chamber 22 is then in contact both with the distal end 232 of the probe and with the substrate. In this configuration, electrochemical microscopy measurements can be carried out conventionally. In particular, a set of measurements can be carried out by moving the portable device 20 manually on the surface of the substrate. A difference with conventional SECM is in that the sample of substrate to be analyzed is not entirely immersed in an electrolyte bath.

Figure 3:
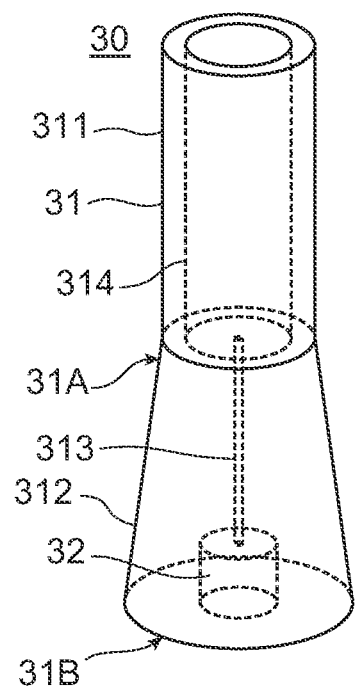
FIG. 3 represents, in a perspective view, a second embodiment example of a portable electrochemical microscopy device according to the invention.

FIG. 3 represents, in a perspective view, a second embodiment example of a portable electrochemical microscopy device according to the invention. The portable device 30 includes, similarly to the portable device 20 described with reference to FIG. 2, a body 31, an electrolytic chamber 32 formed in the body 31 and a working probe, not shown. The portable device 30 differs from the portable device 20 described above in that the body 31 includes a cylindrical section 311 and a tapered section 312. The cylindrical section 311 has an outer surface forming a revolving cylinder and the tapered section 312 has an outer surface forming a frustum. The outer surface of these two sections forms a gripping surface 31A. The frustum flares along the longitudinal axis of the cylindrical section 311 between a first base rigidly connected to the cylindrical section 311 and a second base forming a bearing surface 31B. The electrolytic chamber 32 is formed in the tapered section 312 and opens at the level of the bearing surface 31B. A housing for receiving the working probe 313 is formed in the tapered section 312 and a wire passage opening 314 is formed in the cylindrical section 311. In further embodiment examples, the electrolytic chamber 32 and the housing for receiving the working probe 313 could be partially formed in the cylindrical section 311. Similarly, the wire passage opening 314 could be partially formed in the tapered section 312.

In the embodiment examples in FIGS. 2 and 3, the working probe is attached with respect to the body of the device, such that the distal end thereof is located at a constant distance from the plane formed by the bearing surface, and therefore from the substrate. Nevertheless, the portable electrochemical microscopy device can be arranged such that the distance between the distal end of the working probe and the plane formed by the bearing surface can be modified.

Figure 4A:
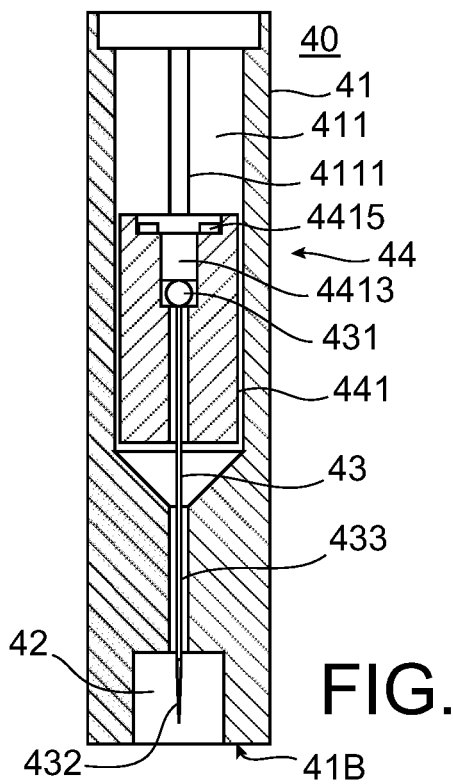
FIG. 4A represents, in a longitudinal sectional view, a third embodiment example of a portable electrochemical microscopy device according to the invention.
Figure 4B:
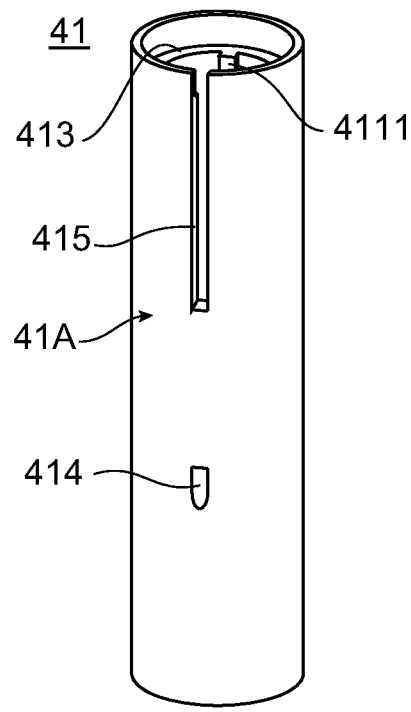
FIGS. 4B and 4C represent, in a perspective view and in a longitudinal sectional view, respectively, a body of the portable device in FIG. 4A.
Figure 4C:
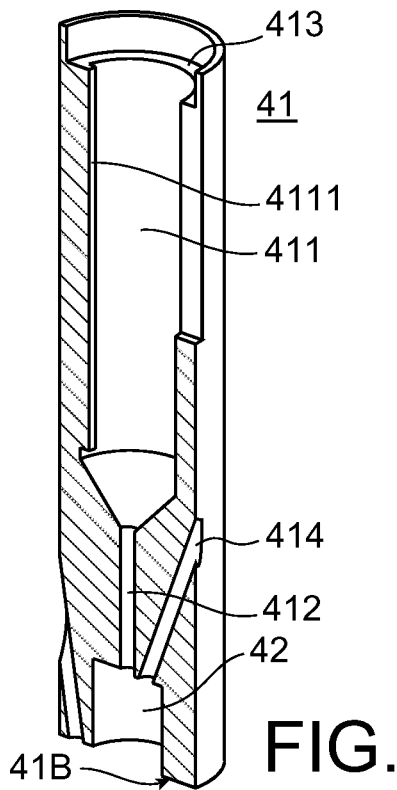
Figure 4D:
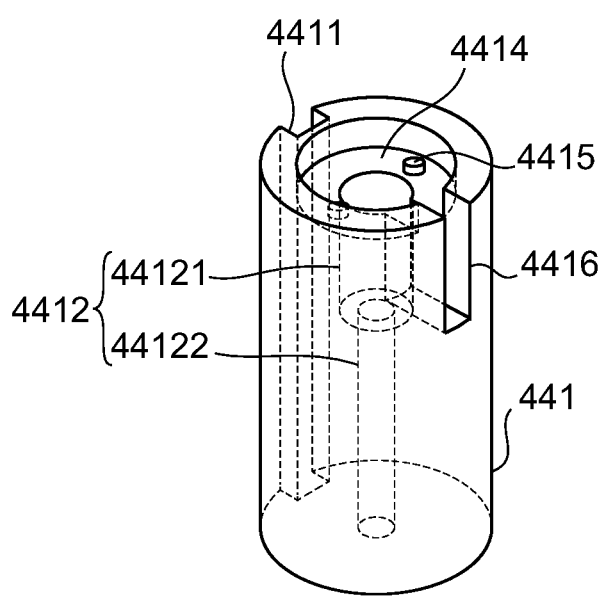
FIG. 4D represents, in a perspective view, a movable member of the portable device in FIG. 4A.
Figure 4E:
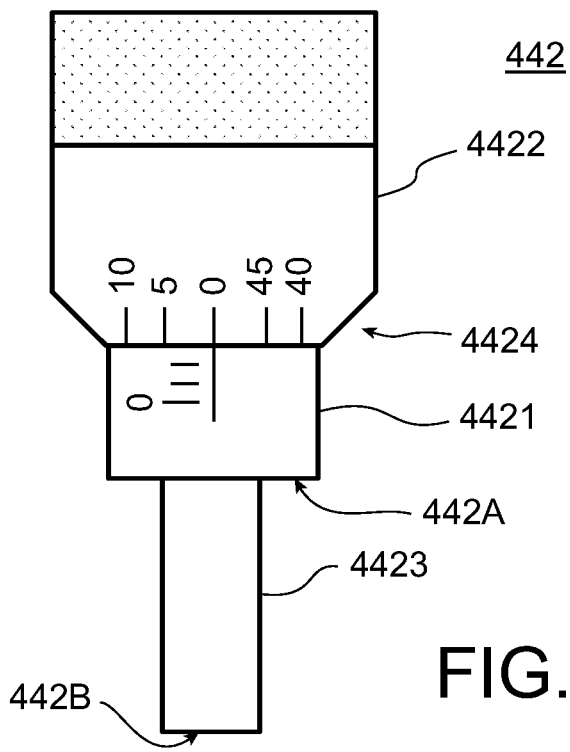
FIG. 4E represents, in a front view, a micrometric screw of the portable device in FIG. 4A.

FIGS. 4A, 4B, 4C, 4D and 4E represent, in a longitudinal sectional view, a third embodiment example of a portable electrochemical microscopy device according to the invention. FIG. 4A represents elements of the portable device in a longitudinal sectional view, FIGS. 4B and 4C represent a body of the portable device in a perspective view and in a longitudinal sectional view, respectively, FIG. 4D represents a movable member of the portable device in a perspective view, and FIG. 4E represents a micrometric screw in a front view. The portable device 40 includes a body 41, an electrolytic chamber 42 formed in the body 41, a working probe 43 and a positioning device 44. The working probe 43 includes a proximal end 431, a distal end 432 and a probe body 433 extending between the proximal end 431 and the distal end 432. A protuberance is formed at the level of the proximal end 431. The positioning device 44 includes a movable member 441 and a micrometric screw 442. The micrometric screw 442 includes a screw body 4421, a knurled adjustment wheel 4422 and a pusher 4423. The screw body 4421 particularly has a so-called reference surface 442A and the pusher 4423 a so-called measurement surface 442B. In a known manner, a rotation of the knurled adjustment wheel 4422 with respect to the screw body 4421 causes a translation of the pusher 4423 with respect to the screw body 4421. A graduation scale 4424 disposed at the interface between the screw body 4421 and the knurled adjustment wheel 4422 makes it possible to determine a variation of the distance between the reference surface 442A and the measurement surface 442B. The body 41 of the portable device 40 has an outer surface forming a revolving cylinder and forming a gripping surface 41A for a user. It includes a guide housing 411 formed at a first longitudinal end, referred to as upper end, and arranged to receive the movable member 441 and guide it in translation along the longitudinal axis thereof. The guide housing 411 has overall a revolving cylindrical shape and includes a tab 4111 extending along the longitudinal axis of the body 41. The movable member 441 has a complementary shape to the guide housing 411. In particular, it includes a groove 4411 wherein the groove 4111 can be inserted. Thus, the movable member 441 is mounted in a sliding link in the guide housing 411. The body 41 further includes a probe passage orifice 412 arranged to allow the passage of the working probe between the guide housing 411 and the electrolytic chamber 42. The electrolytic chamber 42 is formed at a second longitudinal end of the body 41, referred to as the lower end. It defines an annular surface forming a bearing surface 41B for the portable device 40. The body 41 further includes an inner shoulder 413 arranged to come into contact with the reference surface 442A of the micrometric screw 442, an electrolyte injection orifice 414 and a wire passage opening 415. The electrolyte injection orifice 414 extends between the outer surface 41A of the body and the electrolytic chamber 42. It makes it possible to inject, for example using a syringe, an electrolyte into the electrolytic chamber 42. The wire passage opening 415 forms a groove through the wall of the body 41 between the guide housing 411 and the outer surface 41A. It allows the passage of a connection wire connected to the working probe 43. The movable member 441 includes a receiving housing 4412 arranged to receive the working probe 43. The receiving housing 4412 is formed by a first orifice 44121 arranged to receive the protuberance formed on the proximal end 431 and a second orifice 44122 arranged to allow the passage of the probe body 433. The movable member 441 further includes a plug 4413, seen in FIG. 4A, preferably made of elastomeric material, arranged to be inserted with a tight fit into the first orifice 44111 and hold the working probe 43 in position in the movable member 441. The movable member 441 further includes an inner shoulder 4414 arranged to come into contact with the measurement surface 442B of the micrometric screw 442. Magnets 4415 are mounted on the inner shoulder 4414 and enable a temporary coupling between the micrometric screw 442 and the movable member 441. The movable member 441 furthermore includes a wire passage opening 4416 forming a groove extending between the first orifice 44121 of the receiving housing 4412 and an outer surface of the movable member 441. The wire passage opening 4416 is arranged to be coincident with the wire passage opening 415 of the body 41 and allow the passage of the connection wire connected to the working probe 43.

The portable device 40 is suitable for use as follows. The body 41 is handled by a user via the gripping surface 41A thereof and manipulated such that the bearing surface 41B thereof bears on a surface of a substrate to be analyzed. In this configuration, an electrolyte can be injected into the electrolytic chamber 42 via the electrolyte injection orifice 414. The electrolyte then acts as a medium between the distal end 432 of the probe and the substrate. Electrochemical microscopy measurements can thus be carried out conventionally. It should be noted that the portable device 40 is adapted to use with an electrolyte both in liquid form and in the form of a gel.

In the different embodiment examples of a portable electrochemical microscopy device described above, the body of the portable device has an outer surface forming a revolving cylinder and optionally a frustum. Obviously, the invention is not restricted to these embodiment examples and the body can have any surface capable of forming a gripping surface for a user, and in particular for a hand of this user.

In the aim of making the portable device according to the invention entirely handheld, the latter is advantageously associated with a portable potentiostat such as a PG580R bipotentiostat from Uniscan Instruments, a PG581 potentiostat—galvanostat from BioLogic Science Instruments or a µStat 200 or multichannel Dropsens µStat 8000 bipotentiostat from Metrohm.

II—Experimental Validation of the Device According to the Invention

The ability of a device as illustrated in FIGS. 2, 3 and 4A to 4E to enable the analysis and characterization of surfaces by electrochemical microscopy is validated by a series of experimental tests conducted, on one hand, with a liquid electrolyte and, on the other, with an electrolytic gel, on an insulating substrate and on a conductive substrate.

In these tests, the device used measures 8.5 cm high and 2 cm in diameter and comprises:
 a UME consisting of a platinum wire 12 cm long and 50 µm in diameter in a glass capillary; and
 two gold wires as a reference electrode and counter-electrode.

The device is connected to a PG580R bipotentiostat from Uniscan Instruments, which is in turn connected to a data acquisition (LEIS M370™ software from Uniscan Instruments) and processing (Origin™) unit.

Moreover:
 the tip of the UME of the device is considered to be at infinity from a substrate when this tip is located at a distance at least equal to 7 times the height of the conductive wire sealed in the capillary; and
 a standardized current, annotated $I_N$ and with no units, corresponds to the ratio between the current measured with the UME of the device at a time t of an experimental test and the current measured with the UME of the device when the tip thereof is at infinity from a substrate.

II.1—Tests with a Liquid Electrolyte

Hereinafter, the following are used
 an aqueous solution comprising 100 mmol/L of potassium chloride (KCl) and, by way of redox mediator, 50 mmol/L of potassium ferrocyanide ions $[Fe(CN)_6]^{4-}$, supplied in the form of potassium ferrocyanide $K_4[Fe(CN)_6]$, as liquid electrolyte;
 a glass substrate as insulating substrate; and
 a gold substrate as conductive substrate.

The volume of liquid electrolyte present in the device is 0.8 mL.

The device is subjected to a cyclic voltammetry by applying to the UME a continuous potential variation ranging from 0 V to 0.5 V vs Au, at a rate of 0.05 V/s, and measuring the current traversing the UME, the latter being placed at a distance from any substrate.

Figure 5:
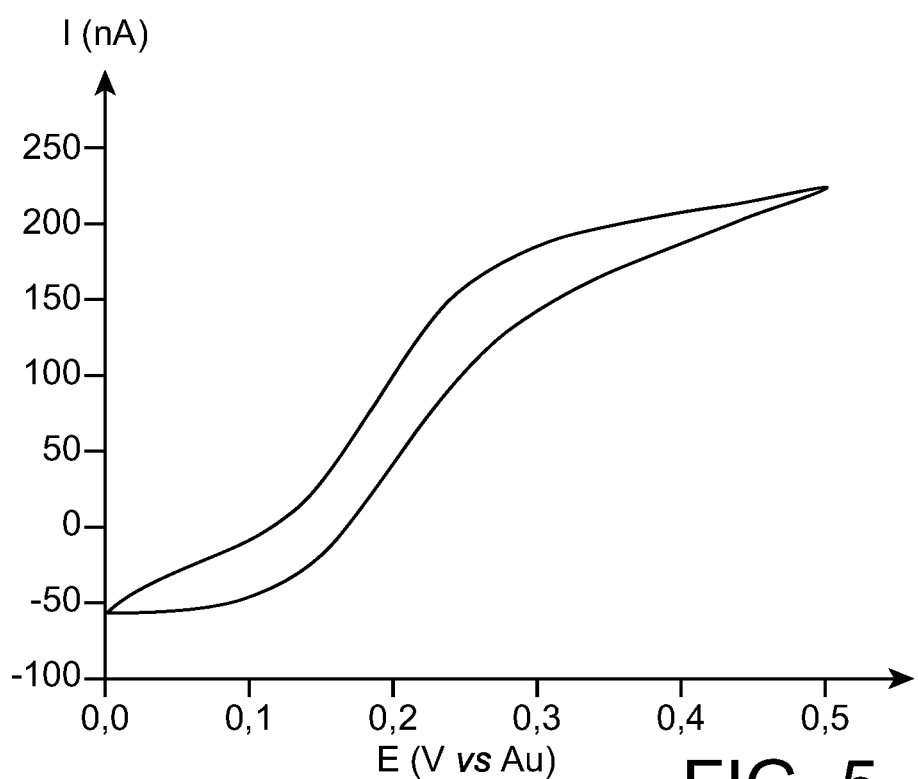
FIG. 5 illustrates the voltammogram as obtained by subjecting a portable electrochemical microscopy device according to the invention to a cyclic voltammetry test, away from any substrate, and wherein this device contains a liquid electrolyte; in this figure, the ordinate axis corresponds to the intensity, annotated I and expressed in nA (nanoamperes), of the current measured with the UME of the device, whereas the abscissa axis corresponds to the potential, annotated E and expressed in V (volts) with respect to the potential of the reference electrode, applied to this UME.

The voltammogram obtained, which is illustrated in FIG. 5, makes it possible to verify that the redox mediator present in the electrolyte is indeed capable of changing from a reduced state to an oxidized state and vice versa under the effect of variations of an electrical potential imposed on the UME of the device and that this UME is indeed capable of converting these changes of state into variations of a measurable current. It also makes it possible to determine the potential to be applied to the UME in the SECM tests hereinafter to ensure oxidation of the redox mediator, namely 0.5 V vs Au.

The device is then subjected to a series of SECM tests, hereinafter tests 1 to 8, wherein the potential applied to the UME is therefore 0.5 V vs Au, whereas the substrates are left at OCP ("Open Circuit Potential"), i.e., no potential is applied thereto.

Test 1:

This test consists of applying the lower end of the device on the surface of a glass substrate and successively placing, by means of the micrometric screw, the tip of the UME of this device at infinity from this substrate then in contact with the surface of this substrate, while measuring the current with the UME of the device.

Figure 6:
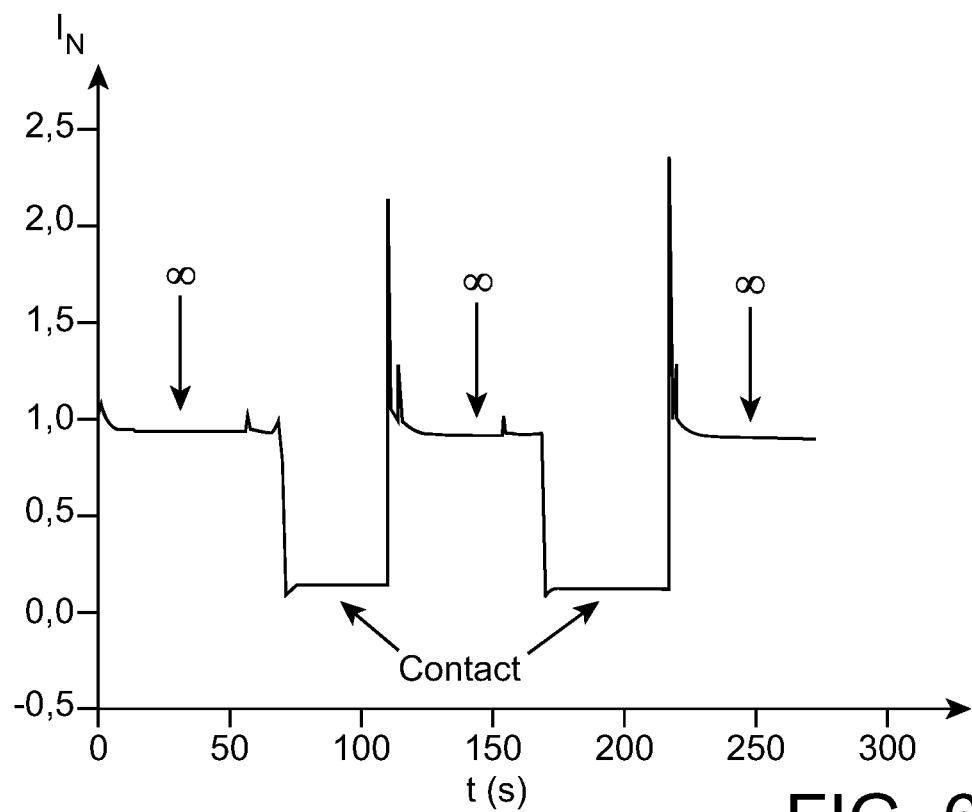
FIG. 6 illustrates the variation of the standardized current, annotated $I_N$, as a function of time, annotated t and expressed in s (seconds), as obtained in a test consisting of successively placing the tip of the UME of a portable electrochemical microscopy device at infinity (∞) from an insulating substrate then in contact with the surface of this substrate and wherein this device contains a liquid electrolyte.

The results are illustrated in FIG. 6 which shows a drastic reduction of the standardized current $I_N$ obtained when the tip thereof comes into contact with the surface of the glass substrate.

These results, which are characteristic of the negative feedback observed in the absence of a reaction between a redox mediator and an insulating surface, are in keeping with those which would be obtained under the same operating conditions with an SECM apparatus according to the prior art.

Test 2:

This test consists of applying the lower end of the device on the surface of a glass substrate and gradually approaching, by means of the micrometric screw and over a period of 40 s, the tip of the UME of this device, initially located at infinity from the substrate, to the surface of this substrate until this top is located 10 μm from this surface, while measuring the current with the UME of the device.

Figure 7:
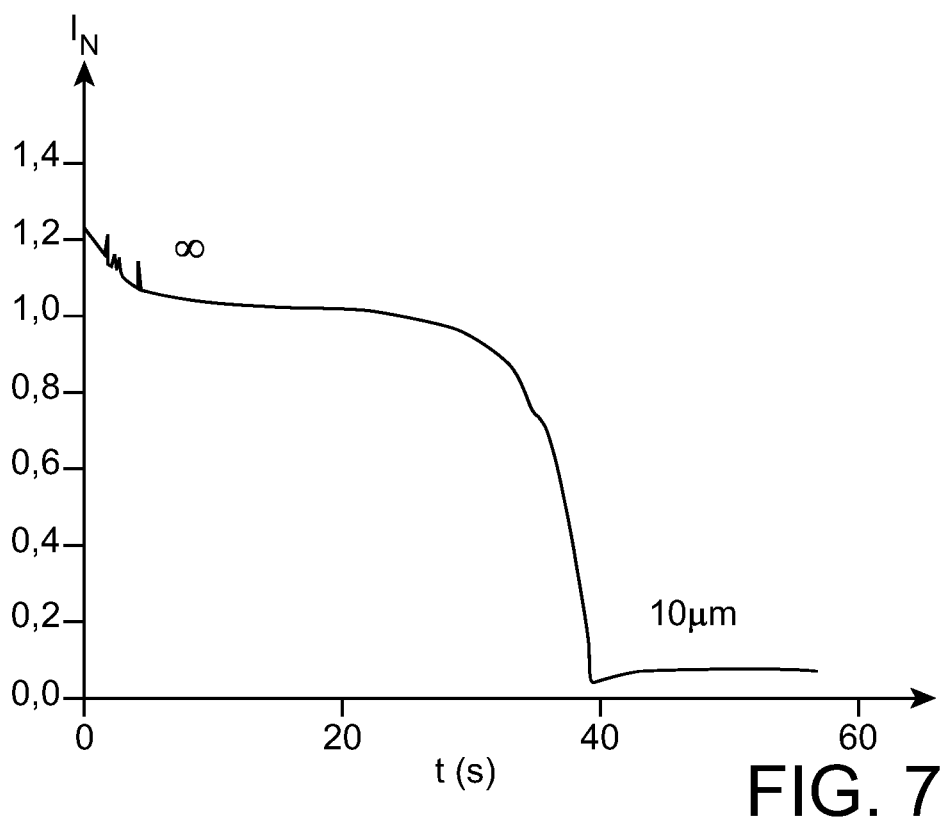
FIG. 7 illustrates the approach curve as obtained in a test consisting of gradually approaching, over a period of 40 s, the tip of the UME of a portable electrochemical microscopy device according to the invention, initially located at infinity (∞) from an insulating substrate, to this substrate until this tip is located 10 μm from the surface of the substrate, and wherein the device contains a liquid electrolyte; in this figure, the ordinate axis corresponds to the standardized current, annotated $I_N$, whereas the abscissa axis corresponds to the time, annotated t and expressed in s.

The results are illustrated in FIG. 7 in the format known as an approach curve. This curve shows a gradual decline in the standardized current $I_N$ obtained as the tip of the UME approaches the surface of the glass substrate, followed by a stabilization of this current when the tip of the UME is located 10 μm from the surface of the substrate.

Here also, these results are in keeping with those which would be obtained under the same operating conditions with an SECM apparatus according to the prior art.

Test 3:

This test, which is a reverse test of test 2 hereinabove, consists of gradually moving, by means of the micrometric screw and over a period of 40 s, away from the surface of the glass substrate the tip of the UME of the device, which is located 10 μm from this surface following the test 2, until this tip is located at infinity from the substrate, while measuring the current with the UME of the device.

Figure 8:
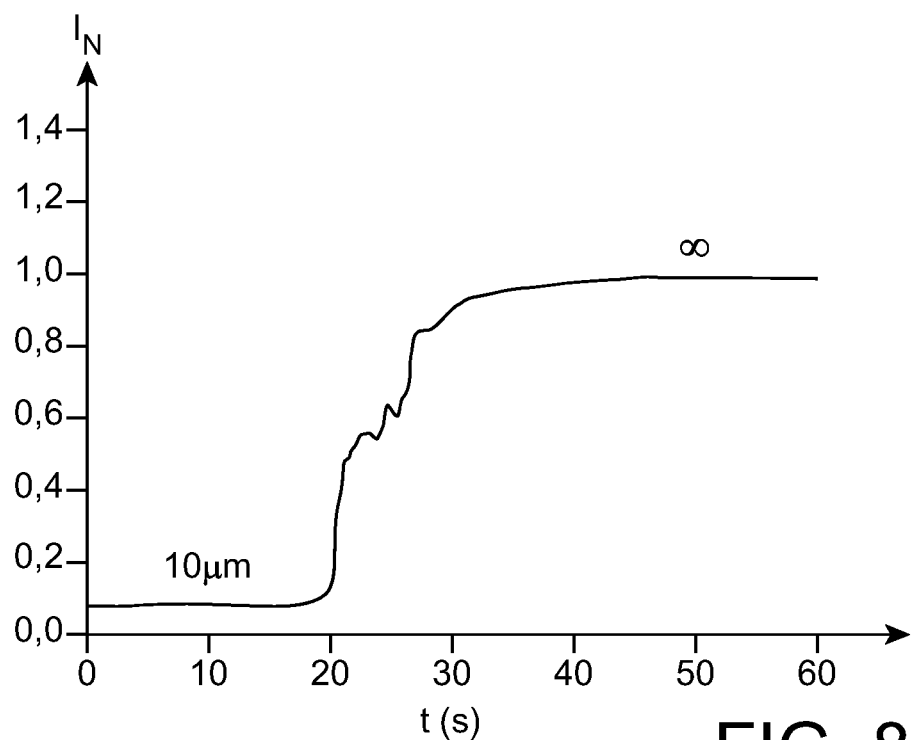
FIG. 8 illustrates the distance curve as obtained in a test consisting of gradually moving, over a period of 40 s, the tip of the UME of a portable electrochemical microscopy device according to the invention, initially located 10μ from the surface of an insulating substrate, away from this substrate until this tip is located at infinity (∞) from the substrate, and wherein the device contains a liquid electrolyte; in this figure, the ordinate axis corresponds to the standardized current, annotated $I_N$, whereas the abscissa axis corresponds to the time, annotated t and expressed in s.

The results are illustrated in FIG. 8 in the format known as a distance curve. This curve shows a gradual increase in the standardized current $I_N$ obtained as the tip of the UME moves away from the substrate, followed by a stabilization of this current when the tip of the UME is located at infinity from the substrate.

Here also, these results are in keeping with those which would be obtained under the same operating conditions with an SECM apparatus according to the prior art.

Test 4:

This test consists of applying the lower end of the device on the surface of a glass substrate, approaching, by means of the micrometric screw and in successive steps of 10 μm, the tip of the UME of this device, initially located at infinity from the substrate, to the surface of this substrate until this tip is located 10 μm from this surface, then moving, also by means of the micrometric screw and in successive steps of 10 μm, the tip of the UME away from the surface of the substrate until this tip is located at infinity from the substrate, while measuring the current with the UME of the device.

Figure 9:
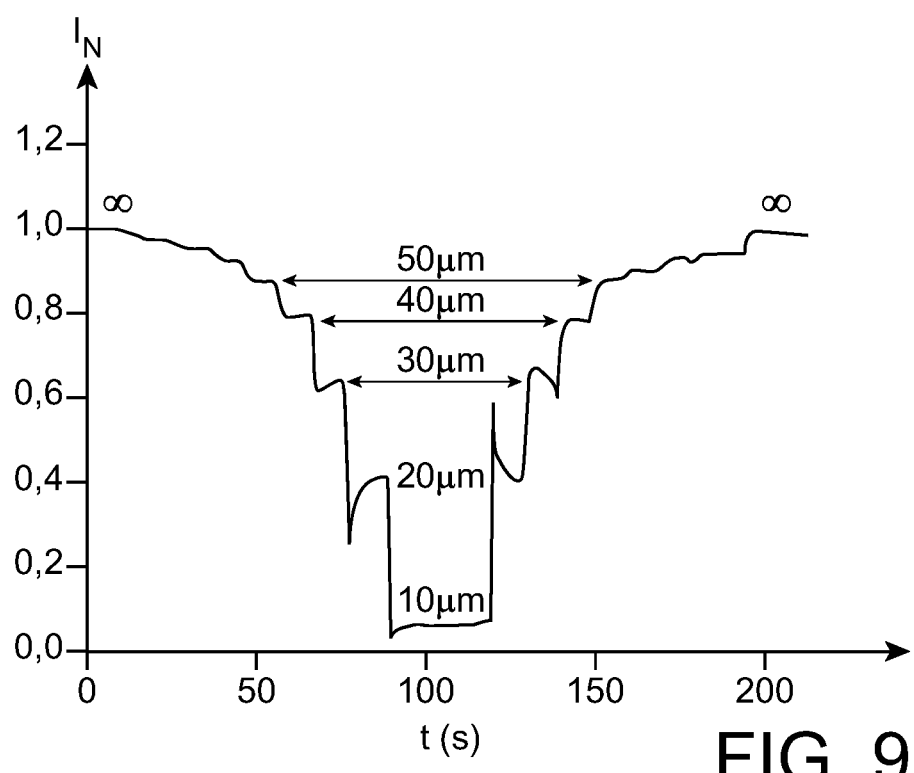
FIG. 9 illustrates the approach (curve on left) and distance (curve on right) curves as obtained in a test consisting of approaching, in successive steps of 10 μm, the tip of the UME of a portable electrochemical microscopy device according to the invention, initially located at infinity (∞) from an insulating substrate, to the surface of this substrate until this tip is located 10 μm from this surface, then moving, also in successive steps of 10 μm, the tip of the UME away from the surface of the substrate until this tip is located at infinity (∞) from the substrate, and wherein the device contains a liquid electrolyte; in this figure, the ordinate axis corresponds to the standardized current, annotated $I_N$, whereas the abscissa axis corresponds to the time, annotated t and expressed in s.

The approach and distance curves illustrated in FIG. 9 are thus obtained. These curves show that, for each of the steps, i.e., for the same distance separating the tip of the UME from the surface of the substrate, the value of the standardized current obtained when the tip of the UME is approached to the substrate is substantially the same as that obtained when this tip is moved away from the surface of the substrate.

Test 5:

This test consists of applying the lower end of the device on the surface of a glass substrate after having preset, by means of the micrometric screw, the tip of the UME of this device according to the invention such that this tip is located at a distance of 10 μm, 30 μm, 40 μm, 50 μm, 60 μm or 100 μm from the surface of the substrate, while measuring the current with the UME of the device.

This test is performed plumb with three different points of the surface of the substrate.

Figure 10:
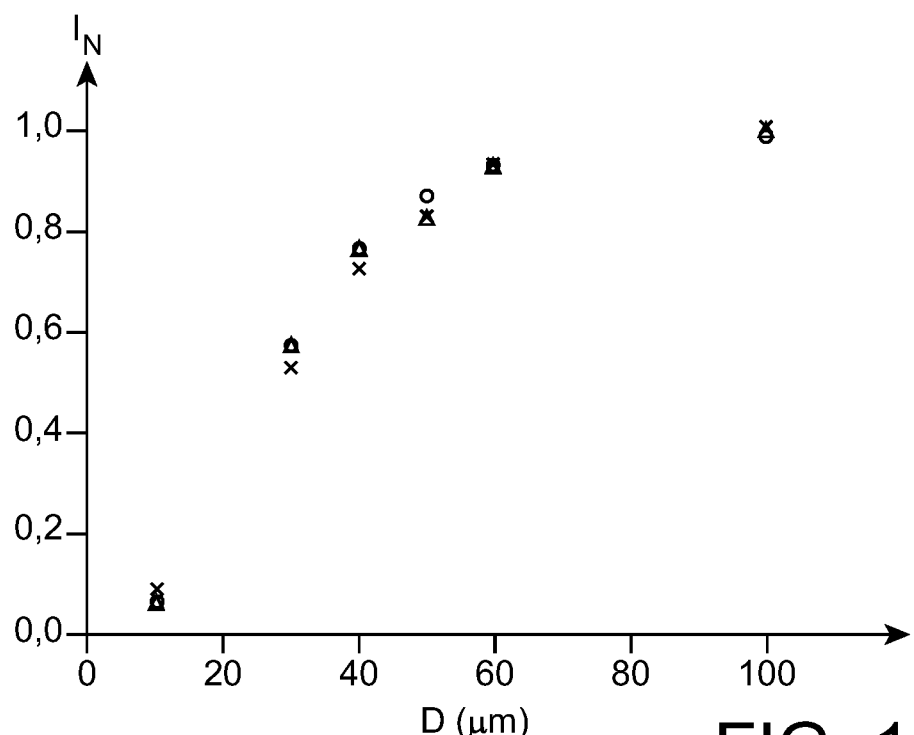
FIG. 10 illustrates the values of the standardized current, annotated $I_N$, as a function of time, annotated t and expressed in s, as obtained in a test consisting of presetting the tip of the UME of a portable electrochemical microscopy device according to the invention such that this tip is located at a predetermined distance, annotated D, of 10 μm, 30 μm, 40 μm, 50 μm, 60 μm or 100 μm from the surface of an insulating substrate when this device is applied on this surface, and wherein the device contains a liquid electrolyte; in this figure, the triangles (Δ) correspond to the values obtained plumb with a first point of the surface of the substrate; the crosses (x) correspond to the values obtained plumb with a second point of the surface of the substrate whereas the circles (o) correspond to the values obtained plumb with a third point of this surface of the substrate.

The results are illustrated in FIG. 10 which shows that, for each of the distances separating the tip of the UME from the surface of the substrate, the standardized current values $I_N$ obtained are identical or quasi-identical for the three different points of the substrate.

They show, on one hand, the reproducibility of the measurements made with the device on a homogeneous surface and, on the other, the possibility of positioning the UME of this device at a predetermined distance from a substrate in a perfectly controlled manner.

Test 6:

In conjunction with test 5, this test consists of applying the lower end of the device on the surface of a glass substrate after having preset, by means of the micrometric screw, the tip of the UME of this device according to the invention such that this tip is located at a distance of 50 μm from the surface of the substrate, while measuring the current with the UME of the device.

This test is performed plumb with five different points of the surface of the substrate.

Figure 11:
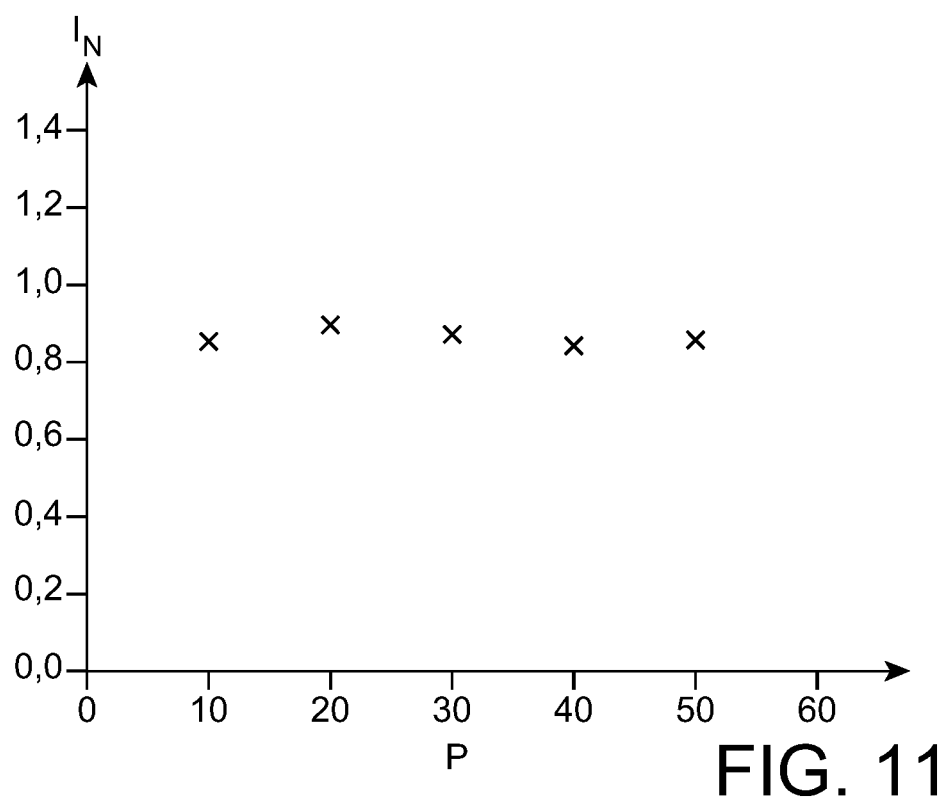
FIG. 11 illustrates the standardized current values, annotated $I_N$, as obtained in a test consisting of presetting the tip of the UME of a portable electrochemical microscopy device according to the invention such that this tip is located at a distance of 50 μm from the surface of an insulating surface when this device is applied on this surface, and wherein the device contains a liquid electrolyte; in this figure, the crosses (x) correspond to the values obtained plumb with five different points, annotated P, from the surface of the substrate.

The results are illustrated in FIG. 11 which confirms the reproducibility of the measurements made with the device on a homogeneous surface and which shows that it is possible to verify the homogeneity or, on the other hand, the heterogeneity of the surface of a substrate by presetting the position of the tip of the UME of the device and by simply moving this device manually on the surface of the substrate.

Figure 12:
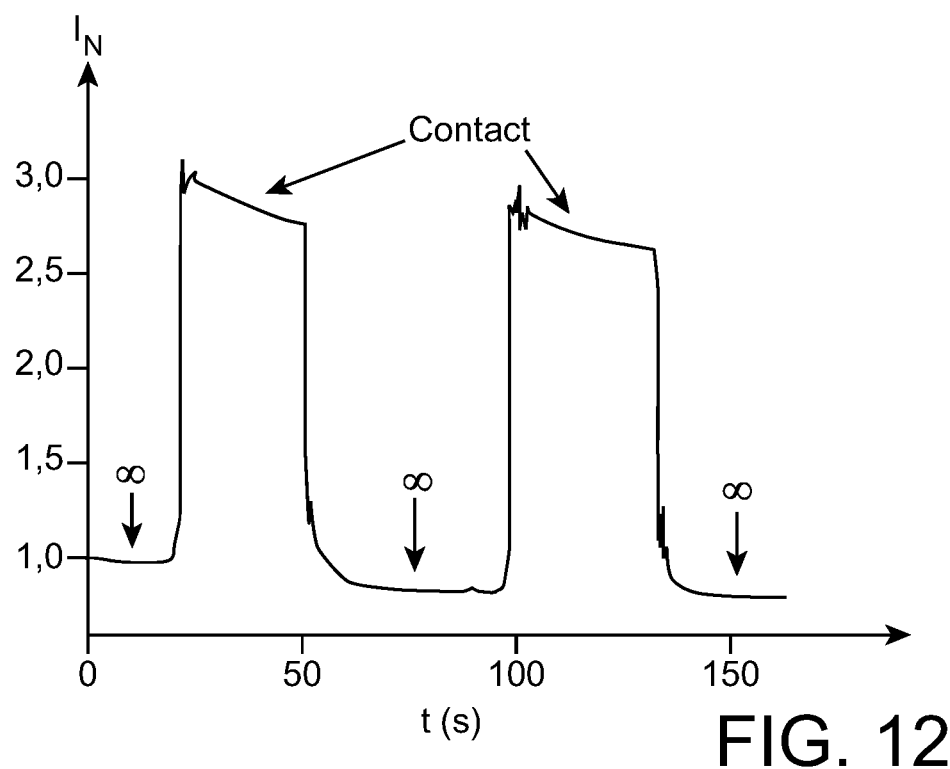
FIG. 12 is a similar figure to FIG. 6 but for a conductive substrate.

Test 7:

This test, the results of which are illustrated in FIG. 12, is a similar test to test 1 but for a gold substrate.

As expected and in keeping with that which would be obtained with an SECM apparatus according to the prior art, FIG. 12 shows a dramatic increase in the standardized current $I_N$ obtained when the tip of the UME of the device comes into contact with the surface of the substrate, characteristic of the positive feedback observed when a redox mediator reacts with an electroconductive surface.

Test 8:

This test consists of applying the lower end of the device on the surface of a gold substrate and approaching, by means of the micrometric screw and in successive steps of 10 μm, the tip of the UME of this device, initially located at infinity from the substrate, to the surface of this substrate until this top is located 10 μm from this surface, while measuring the current with the UME of the device.

Figure 13:
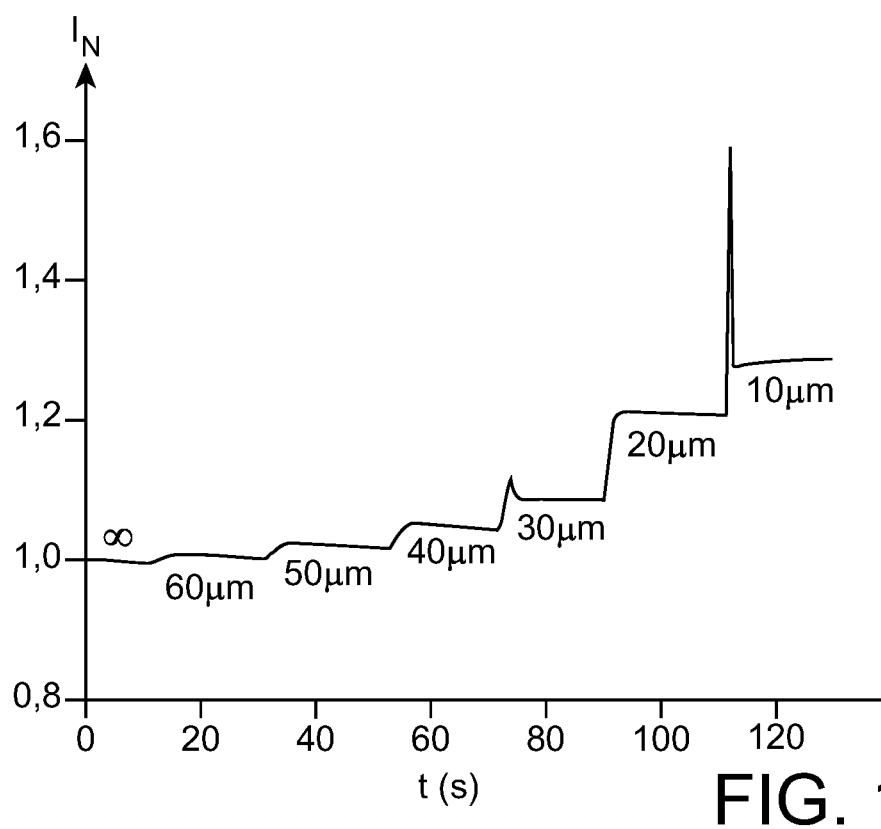
FIG. 13 illustrates the approach curve as obtained in a test consisting of approaching, in successive steps of 10 μm, the tip of the UME of a portable electrochemical microscopy device according to the invention, initially located at infinity (∞) from a conducting substrate, to this substrate until this tip is located 10 μm from this surface, and wherein the device contains a liquid electrolyte; in this figure, the ordinate axis corresponds to the standardized current, annotated $I_N$, whereas the abscissa axis corresponds to the time, annotated t and expressed in s.

The approach curve illustrated in FIG. 13 is thus obtained, which is in keeping with that which would be obtained with an SECM according to the prior art.

II.2—Tests with an Electrolytic Gel

Hereinafter, the following are used:

an aqueous gel obtained by adding xanthan gum (200 mg) to 50 mL of an aqueous solution comprising 100 mmol/L of potassium chloride (KCl) and, by way of redox mediator, 100 mmol/L of potassium ferrocyanide ions $[Fe(CN)_6]^{4-}$, supplied in the form of potassium ferrocyanide $K_4[Fe(CN)_6]$, as electrolyte;

a glass substrate as insulating substrate; and a gold substrate as conductive substrate.

The volume of electrolytic gel present in the device is 0.8 mL.

The device is subjected to a cyclic voltammetry by applying to the UME a continuous potential variation ranging from 0 V to 0.6 V vs Au, at a rate of 0.05 V/s, and measuring the current traversing the UME, the latter being placed at a distance from any substrate.

Figure 14:
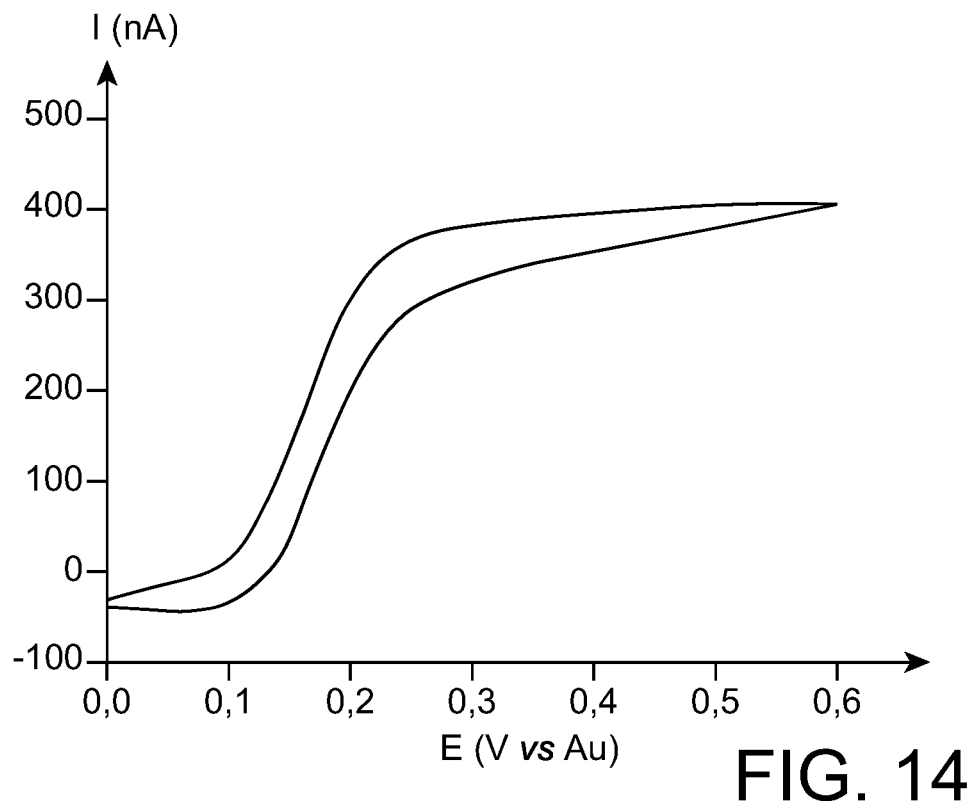
FIG. 14 is a similar figure to FIG. 5 but for a portable electrochemical microscopy device according to the invention containing an electrolytic gel.

Here also, the voltammogram obtained, which is illustrated in FIG. 14, makes it possible to verify that the redox mediator present in the electrolyte is indeed capable of changing from a reduced state to an oxidized state and vice versa under the effect of variations of an electrical potential imposed on the UME of the device and that this UME is indeed capable of converting these changes of state into variations of a measurable current, and to determine the potential to be applied to the UME in the SECM tests hereinafter to ensure oxidation of the redox mediator, namely 0.5 V vs Au.

The device is then subjected to series of SECM tests, hereinafter tests 9 and 10, wherein the potential applied to the UME is therefore 0.5 V vs Au, whereas the substrates are left at OCP.

Test 9:

This test is a similar test to test 1 hereinabove.

Figure 15:
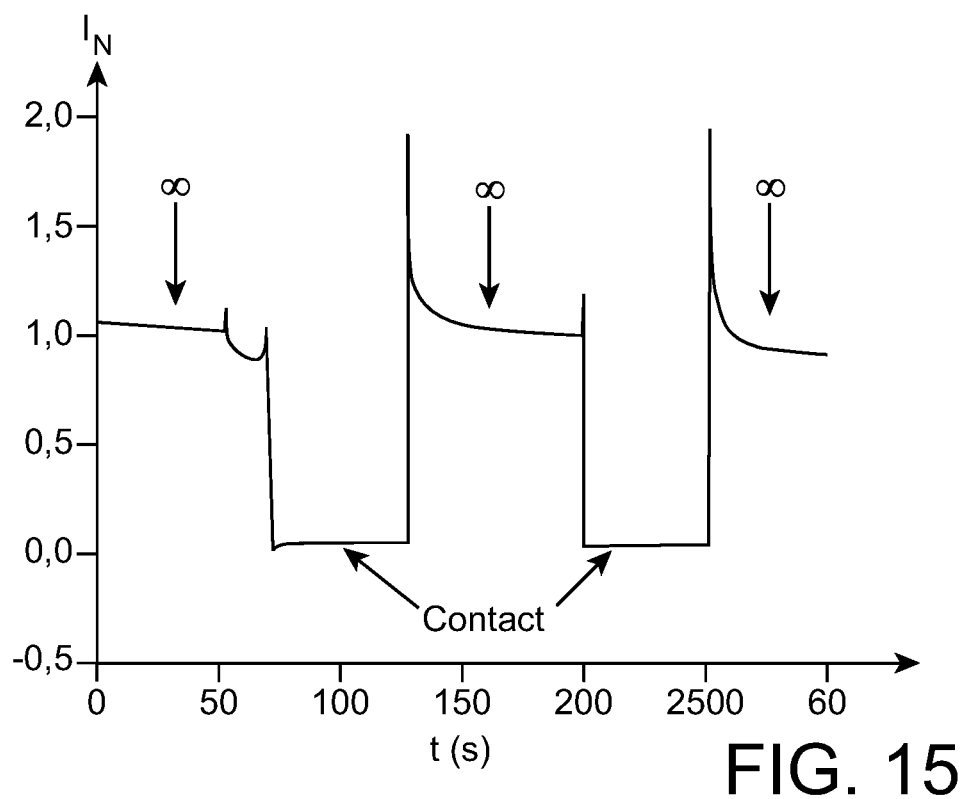
FIG. 15 is a similar figure to that of FIG. 6 but for a portable electrochemical microscopy device according to the invention containing an electrolytic gel.

The results are illustrated in FIG. 15 which, like FIG. 6, shows a drastic reduction of the standardized current $I_N$ obtained when the tip thereof comes into contact with the surface of the glass substrate, characteristic of negative feedback.

Test 10:

This test is a similar test to test 7 hereinabove.

Figure 16:
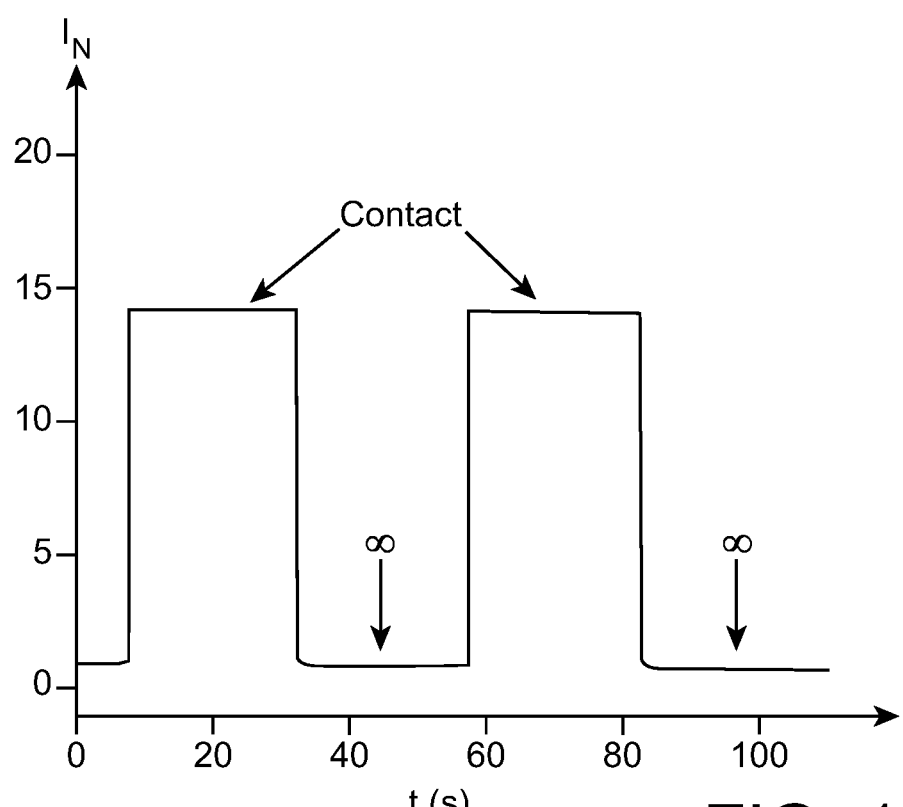
FIG. 16 is a similar figure to that of FIG. 12 but for a portable electrochemical microscopy device according to the invention containing an electrolytic gel.

The results are illustrated in FIG. 16 which, like FIG. 12, shows a drastic increase of the standardized current $I_N$ obtained when the tip thereof comes into contact with the surface of the gold substrate, characteristic of positive feedback.

The invention claimed is:

1. A portable electrochemical microscopy device, comprising:
an elongated body having a first end, a second end positioned opposite to the first end with respect to a longitudinal axis of the elongated body, a gripping surface, and a planar bearing surface, the gripping surface configured to be handled by a user and the bearing surface being arranged at the second end of the elongated body, the bearing surface configured to bear on a surface of a substrate to be analyzed;
an electrolytic chamber formed in the body, arranged to receive an electrolyte, the electrolytic chamber including a chamber first end located within the elongated body and a chamber second end opposite to the chamber first end, the chamber second end being coplanar with the second end of the elongated body and coplanar with the bearing surface, an opening of the electrolytic chamber being coplanar with the chamber second end such that the opening of the electrolytic chamber is coplanar with the bearing surface;
a receiving housing formed within the elongated body; and
a working probe extending through the receiving housing and having a distal end disposed in the electrolytic chamber, the working probe being arranged such that the distal end is located at a predetermined distance from a plane passing through the bearing surface,
wherein the elongated body has a first diameter, the electrolytic chamber has a second diameter, and the receiving housing has a third diameter, and wherein the first diameter, second diameter and third diameter are different from each other.

2. The portable device of claim 1, wherein the working probe is attached to the body, such that the distal end thereof is fixed with respect to the plane passing through the bearing surface.

3. The portable device of claim 1 further comprising a positioning device arranged to enable a movement of the working probe relative to the bearing surface.

4. The portable device of claim 3, wherein the positioning device includes a movable member and a drive mechanism, the movable member being arranged to bear the working probe and to be capable of being moved in translation with respect to the body along an axis of translation, the drive mechanism being arranged to move the movable member with respect to the body.

5. The portable device of claim 4, wherein the body of the portable device includes a guide housing, the guide housing and the movable member being arranged so that the movable member is guided in translation with respect to the body.

6. The portable device of claim 4, wherein the drive mechanism includes a micrometric screw having a reference surface and a movable surface, the micrometric screw being arranged to enable a modification of a distance separating the reference surface from the movable surface, the reference surface being arranged to be rigidly connected to the body and the movable surface being arranged to be rigidly connected to the movable member.

7. The portable device of claim 4, wherein the movable member includes a housing for receiving the working probe and an attachment member, the receiving housing being arranged to receive a proximal end of the working probe and the attachment member being arranged to attach the working probe to the movable member.

8. The portable device of claim 4, wherein the positioning device further includes a temporary coupling mechanism arranged to reversibly couple the movable member to the drive mechanism.

9. The portable device of claim 1, further including at least one additional working probe, each additional working probe having a distal end disposed in the electrolytic chamber.

10. The portable device of claim 1, wherein the body includes a cylindrical section and a tapered section, the cylindrical section having an outer surface forming a revolving cylinder and the tapered section having an outer surface forming a frustum flaring between a first base, rigidly connected to the cylindrical section, and a second base forming the bearing surface.

11. The portable device of claim 1, wherein the body includes an electrolyte injection orifice extending between an outer surface of the body and the electrolytic chamber.

12. An electrochemical microscopy kit, which comprises the portable device of claim 1, filled with an electrolyte, and operating instructions.

13. The kit of claim 12, wherein the electrolyte includes a gelling agent.

14. A method for analyzing and/or characterizing a surface of a substrate comprising:
- filling the electrolytic chamber of the portable device of the kit of claim 12 with an electrolyte;
- contacting the bearing surface of the portable device with the surface of the substrate; and
- measuring a current flowing through the working probe of the portable device.

15. The electrochemical microscopy kit, which comprises the portable device of claim 1, a container containing an electrolyte and operating instructions.

16. The portable device of claim 1, wherein the electrolyte includes a gelling agent.

17. A method for analyzing and/or characterizing a surface of a substrate comprising:
- filling the electrolytic chamber of the portable device of claim 1 with an electrolyte;
- contacting the bearing surface of the portable device with the surface of the substrate; and
- measuring a current flowing through the working probe of the portable device.

* * * * *